United States Patent
McKinney

(10) Patent No.: US 9,056,590 B2
(45) Date of Patent: Jun. 16, 2015

(54) DETACHABLE FRONT LICENSE PLATE MOUNTING SYSTEM

(71) Applicant: Michael Patrick McKinney, Prunedale, CA (US)

(72) Inventor: Michael Patrick McKinney, Prunedale, CA (US)

(*) Notice: Subject to any disclaimer, the term of this patent is extended or adjusted under 35 U.S.C. 154(b) by 0 days.

(21) Appl. No.: 13/845,003

(22) Filed: Mar. 17, 2013

(65) Prior Publication Data
US 2014/0263923 A1    Sep. 18, 2014

Related U.S. Application Data

(60) Provisional application No. 61/618,903, filed on Apr. 2, 2012.

(51) Int. Cl.
*A47G 29/02*      (2006.01)
*B60R 13/10*      (2006.01)

(52) U.S. Cl.
CPC .................................. *B60R 13/105* (2013.01)

(58) Field of Classification Search
CPC .............................. B60R 13/105; B60R 13/10
USPC ............. 248/121, 224.7, 240.4, 286.1, 298.1; 40/200, 201, 209; 224/496
See application file for complete search history.

(56) References Cited

U.S. PATENT DOCUMENTS

| | | | | |
|---|---|---|---|---|
| 5,570,826 | A * | 11/1996 | Garbes et al. ................. | 224/524 |
| 5,603,178 | A * | 2/1997 | Morrison ........................ | 40/591 |
| 6,007,033 | A * | 12/1999 | Casson et al. ............. | 248/224.7 |
| 6,945,551 | B2 * | 9/2005 | Blake ............................ | 280/507 |
| 7,818,905 | B1 * | 10/2010 | Stahel et al. .................... | 40/492 |
| 8,245,996 | B1 * | 8/2012 | Ciabaszewski ............... | 248/550 |

\* cited by examiner

*Primary Examiner* — Gwendolyn Baxter
(74) *Attorney, Agent, or Firm* — Patent Alchemy

(57) ABSTRACT

One bracket assembly constructed of aluminum; however any metal, modern plastic or composite material may be substituted. Bracket assembly consists of a front mounting plate (FIG. 2) and a base mounting assembly or plate (FIG. 3). The base mounting assembly or plate contains a pull pin (FIG. 3, 15) locking device, which is attached to the base plate by square aluminum nut (FIG. 3, 17) welded to the tube. The front mounting plate consists of a notch (FIG. 2, 9) in the rod (8) that the pull pin (FIG. 3, 15) locks in to. This allows for assembly of the bracket and quick removal of the front mounting plate (FIG. 2) when desired. Other embodiments are described and shown.

4 Claims, 4 Drawing Sheets

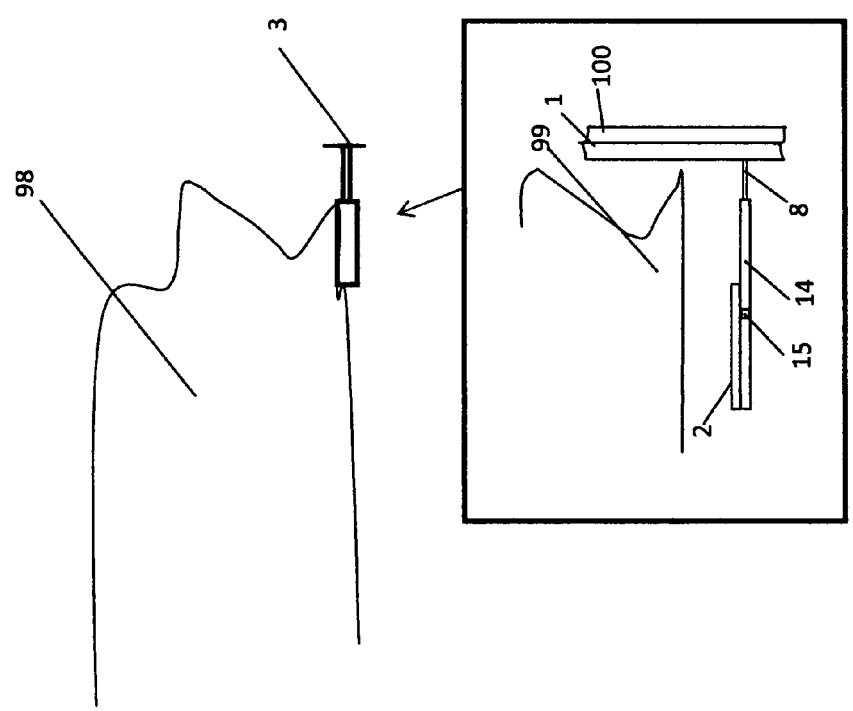

# DETACHABLE FRONT LICENSE PLATE MOUNTING SYSTEM

BACKGROUND

1. Field of the Invention

The invention relates to a bracket for mounting a front license plate to an automotive vehicle, and more particularly, to an automotive vehicle that has an integrally designed and designated front license plate mounting location embodied as part of the front exterior of the vehicle that includes an associated integral license plate mounting mechanism, but said location greatly detracts from appearance and value of said vehicle if license plate were to be mounted there.

2. Background of the Invention

31 States in the United States require an automotive vehicle to have a license plate mounted to the front of the vehicle. Mounting a license plate to the front of a performance vehicle becomes difficult when the vehicle has factory integrally designed and designated front license plate mounting location embodied as part of the front exterior of the vehicle that includes an associated integral license plate mounting mechanism that detracts from the appearance and value by forcing vehicle owners who wish to comply with state laws, to drill or screw into the front fascia of the vehicle leaving permanent damage. In such cases, an add on accessory license plate mounting bracket is typically used which is typically molded from a composite material and attached to the front fascia of the vehicle using two way adhesive tape. Attaching the bracket to the front fascia in this manner causes several problems. The bracket leaves abrasion marks in the paint of the front fascia that requires costly re-painting of the fascia if the bracket is removed such as in the case where the vehicle owner moves to another state that does not require a front license plate to be mounted on the front of a vehicle. Also, if two way adhesive tape is used to attach the bracket to the front fascia, the bracket can unexpectedly come off when high temperatures are experienced or when the vehicle is at high speed or when the vehicle is taken through a car wash, causing potentially serious and costly damage to the vehicle. Accordingly, it would be very desirable and beneficial to provide a front license plate mounting bracket that would be easily assembled and easily mounted to the vehicle using existing fastener locations where possible below the bumper of the vehicle; and that would not damage the front fascia of the vehicle or its painted surface; and that would have its license mounting bracket, with the license plate attached, easily detached for purposes of displaying the vehicle without the unsightly front license plate, and that would provide a rigid and durable platform for the license plate that would not unexpectedly come off and cause damage to the vehicle.

SUMMARY OF THE INVENTION

The invention is a bracket mounting system for mounting a front license plate to an automotive vehicle that has an integrally designed and designated front license plate mounting location embodied as part of the front exterior of the vehicle that includes an associated existing, integral license plate mounting mechanism, but would greatly detract from the appearance and value of said vehicle if the factory mounting location was used. The bracket provides for the mounting of the front license plate in such a manner so as not to cause damage to the front of these vehicles and without requiring any modifications to the vehicle and only minor drilling of holes into the underside of the vehicle causing no damage that would detract from its appearance or value. The bracket includes a front license plate mount. The license plate mount has a triangular shaped front surface with one or more rods attached to the plate. The base plate is comprised of a flat plate and one or more tubes, using a locking pin which allows the license plate mount to be attached to the base plate in a quick and easy manner. Thus, the license plate mounting bracket can quickly and easily be removed at any time. While the preferred material to be used is aluminum, any suitable metal, modern plastic or composite material may be used. Additionally while the current configuration is aluminum round tubes and round solid rods for the attaching of the two assemblies, any shape that would allow for the sliding and de-sliding of the two assemblies could be substituted. The main focus is on the ability to slide together and then de-slide the two assemblies and allow them to be pinned or locked together.

BRIEF DESCRIPTION OF THE DRAWINGS

The present invention will be more fully understood by reference to the specification of the preferred embodiment when read in conjunction with the accompanying drawings in which the reference numbers refer to like parts throughout the several views.

FIG. 4 is a perspective frontal view of the bracket assembly with an attached license plate mounted in place to the front of a vehicle in accordance with the invention.

DETAILED DESCRIPTION OF THE PREFERRED EMBODIMENTS

The bracket assembly (3) with an attached license plate (100) mounted in place under bumper (99) of the front (98) of a vehicle is shown in FIG. 4.

Figure 1:
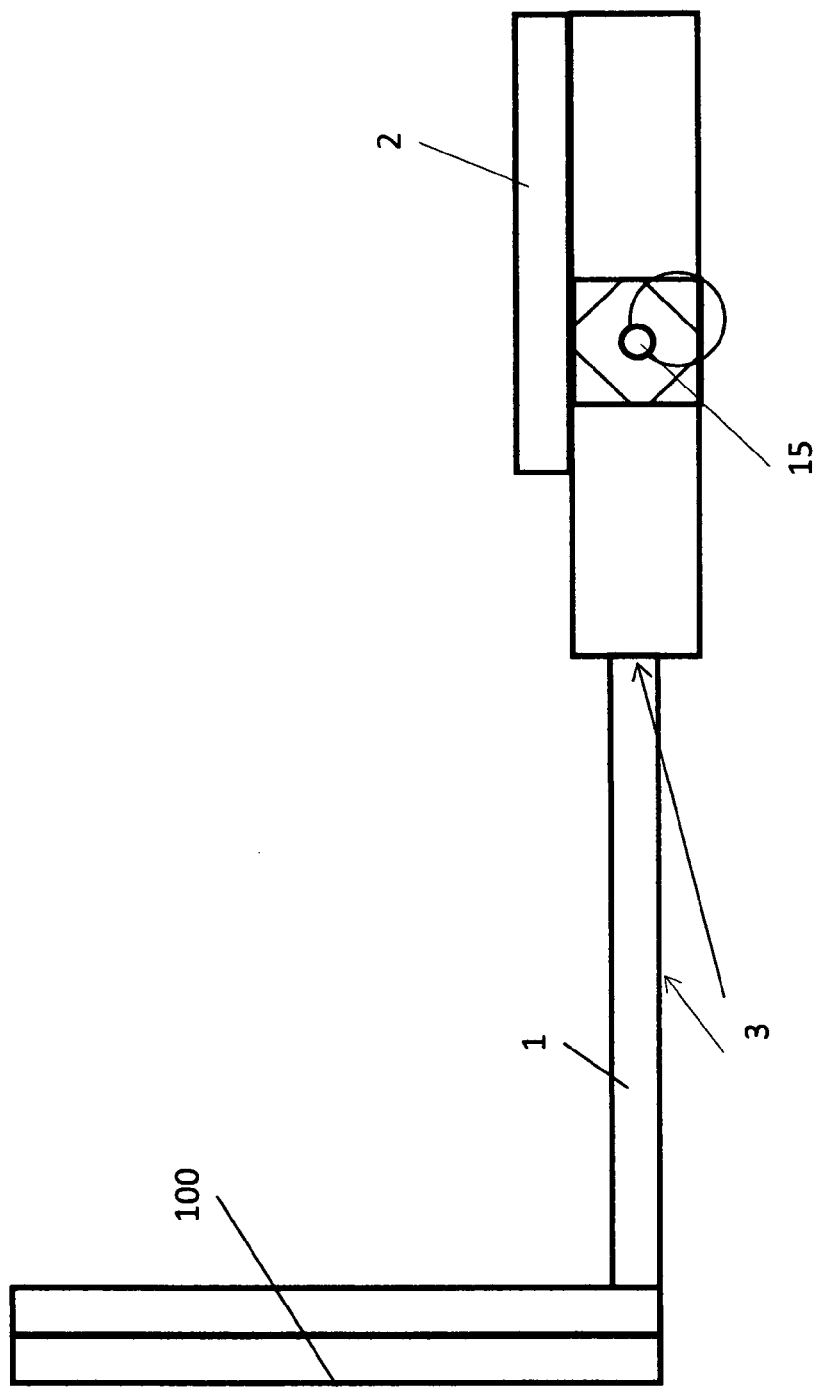
FIG. 1 is an orthogonal view of the body of the bracket assembly in accordance with the present invention.

As depicted in FIG. 1 the bracket assembly (3) includes a front mounting Plate (1), in which the license plate is affixed (100), a base mounting plate (2) and a pull pin (15) for detaching front mounting plate (1) from the base mounting plate (2).

Figure 2:
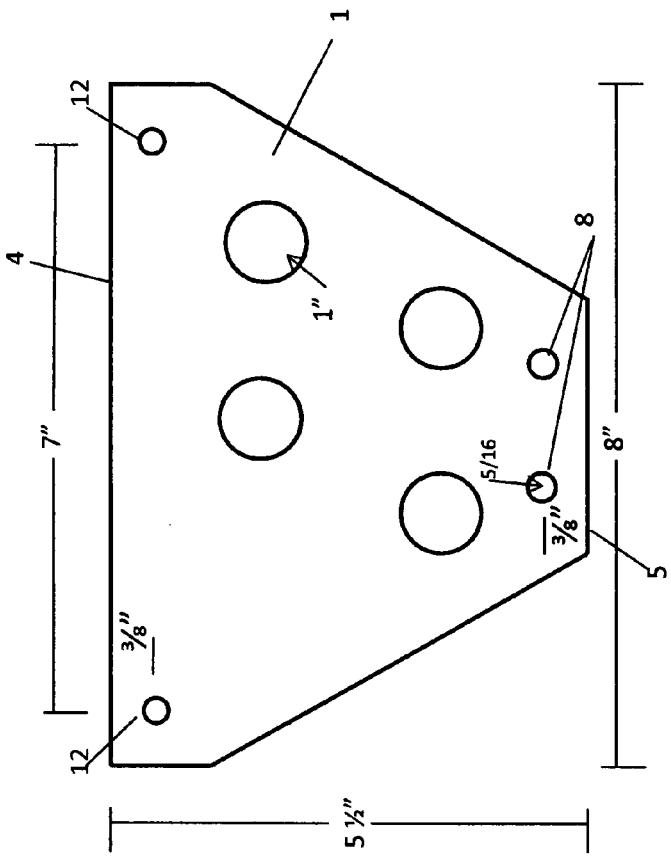
FIG. 2 is an orthogonal view of the Front mounting plate of the bracket assembly in accordance with the present invention.
Figure 2:
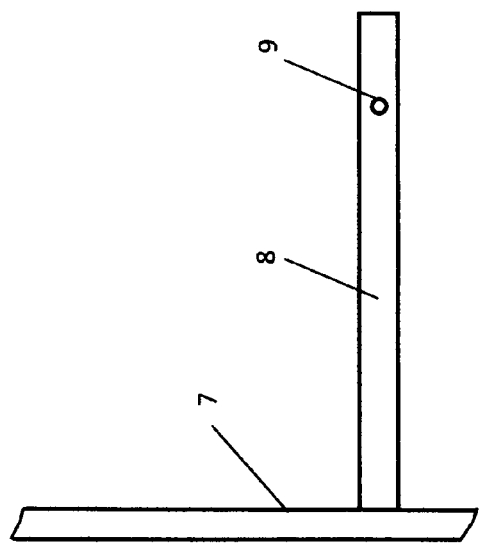

As depicted in FIG. 2 the front mounting plate (1) which has a top (4), a bottom (5), a front (6), a rear (7), a pair of rods (8) with a notch (9) for securing, and two ¼ inch holes (12) for mounting the license plate (100).

Figure 3:
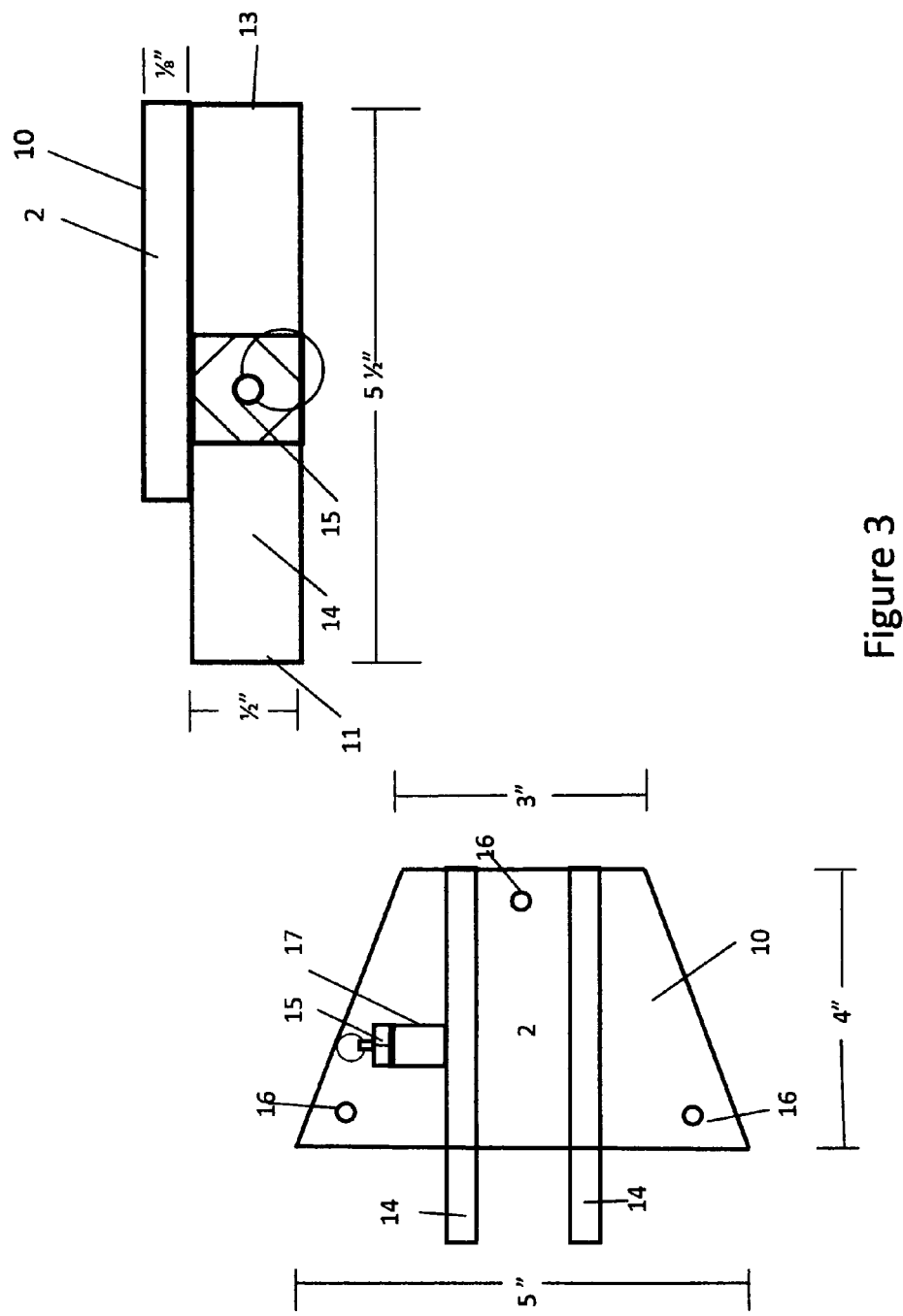
FIG. 3 is an orthogonal of the base mounting plate of the bracket assembly in accordance with the present invention.

As depicted in FIG. 3 the base mounting assembly (2) which has a top (9), a bottom (10), a front (11), a rear (13), a pair of tubes (14) and a pull pin (15) locking device that secures the two assemblies together. The pull pin (15) is attached to the base plate via square nut (17) welded to the side of the tube. The base mounting plate (2) has two tubes (14), which receive the rods (8) of the front mounting plate (1) as shown in FIG. 2. Additionally the base plate shown (2) has three ¼ inch holes (16) for mounting the base plate (2) to the vehicle (98) as shown in FIG. 4. Note: base plates vary in shape and size, as well as the number of holes drilled depending on actual vehicle fitted.

As best depicted in FIG. 4 the Bracket assembly (3) is attached to the vehicle by means of the base mounting plate (2) utilizing existing holes or drilling new ones in a location well under the bumper where said location will neither affect value or appearance of vehicle. While the front mounting assembly (1) will remain consistent from vehicle to vehicle, the base mounting plates (2) shape and size will vary depending on the vehicle model and type. Variations of exact shape and size are made obvious to one of ordinary skill knowledge of the art are in light of the present disclosure. However, the method for removing and installing the front mounting assembly (1) from the vehicle, the two assemblies sliding together and locking in place will remain the same. The license plate (100) is installed on the front of the front mounting plate (1) with the screws provided. The mounted license plate (100), is easily attached and detached from the vehicle by simply grasping the pull pin (15), and sliding the front mounting Plate (1) forward. To reinstall simply align front mounting plate rods (8) with base mounting plate tubes (14) and slide together allowing pull pin (15) to lock the front mounting plate (1) into place.

While the bracket assembly (3) as shown in FIG. 1 can be made from other suitable materials known in the arts, using several different manufacturing processes known in the arts, the selected material is aluminum that is machined, using equipment of various types, to produce the bracket assembly (3). By using aluminum the bracket assembly (3) is light, durable, rigid, corrosion resistant, can be molded as necessary and can accept a variety of different finishes, such as, paint, powder coating, anodizing and polishing.

ADVANTAGES

Accordingly, from the description above it is apparent that my bracket assembly, the present invention, has many advantages and benefits which include the following:

First, the bracket assembly is easily mounted to the undercarriage of the vehicle in such a way as to not affect the appearance or value of the vehicle, thus eliminating the need to use the factory location.

Second, the Front mounting assembly containing the license plate mounted to it can be easily removed from the vehicle in those situations where it is desirable to do so, such as, displaying the vehicle at car show, taking the vehicle through a car wash.

Third, the bracket assembly does not damage the painted surface of the vehicle or the front fascia of the vehicle.

Forth, the bracket assembly is light, durable and rigid.

Fifth, the bracket will not come off unexpectedly in high temperature situations or when the vehicle is at high speeds.

Sixth, the bracket assembly will accept a variety of finishes, such as, paint, powder coating, anodizing and polishing.

Seventh, the bracket assembly, when mounted to a vehicle, is positioned substantially below the grille opening of the vehicle so as not to impede the flow of air to the cooling system of the vehicle.

These advantages and benefits of my invention should not be construed as limiting the scope of my invention, but merely presenting some of the many advantages and benefits of my invention.

What is claimed is:

1. A bracket assembly for mounting a front license plate with quick install and removal of said license plate from a vehicle comprising;
    said vehicle having an integrally designed and designated front license plate mounting location embodied in the front exterior of said vehicle that includes an integral means for mounting said license plate,
    a bracket assembly with a detachable front license plate plane portion mount coupled with a base plate mounted below the vehicle's front bumper attached to said integral means for mounting said license plate to decrease visibility to near visual undetectable levels,
    said vehicle front having the planar portion mount adapted for mounting said license plate thereto, and
    and one or more rods extending from the planar portion mount into said assembly base having one or more attached rod insert tubes for said one or more rods to slide into position and be pinned and locked, and
    the pin lock allowing the quick installation or removal of the front license plate by simply removing retaining pin and sliding said front mounting plate in or out,
    whereby said front license plate said base plate is base plate attached to the lower part of the vehicle.

2. The bracket of claim 1, wherein the front license plate mount of said bracket consists of a flat mounting surface and at least one rod mounted at a 90 degree angle with a hole drilled into it to allow for pinning or locking.

3. The bracket of claim 1, wherein the base plate of said bracket further comprises a flat plate and at least one hollow tube, said hollow tube is drilled to allow for pinning or locking to the front license plate mount.

4. The bracket of claim 1, wherein the front license plate mount and base plate have a specific uniquely configured physical structure to allow said plate mount and one ore more rods to be slid together and pinned or locked together.

* * * * *